A. SONSTHAGEN.
MACHINE FOR COATING CHOCOLATE BONBONS.
APPLICATION FILED MAR. 25, 1920.
Patented Oct. 11, 1921.
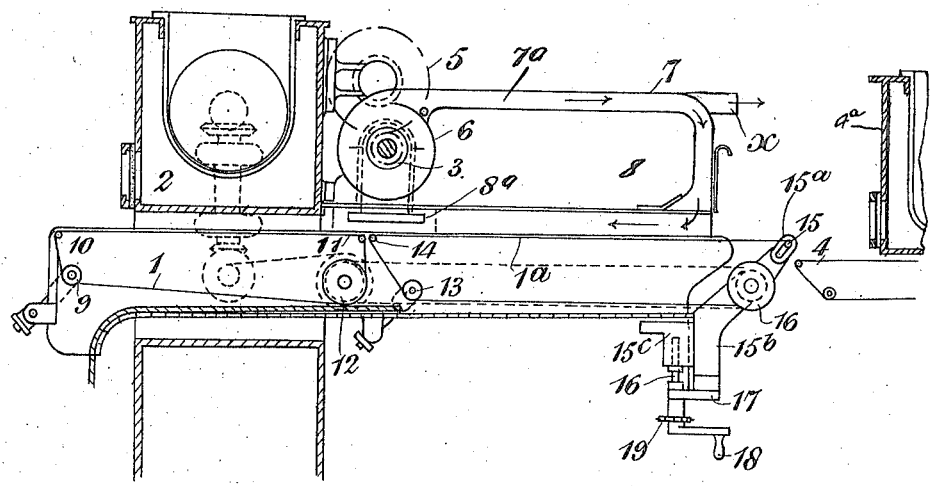
Fig: 1.
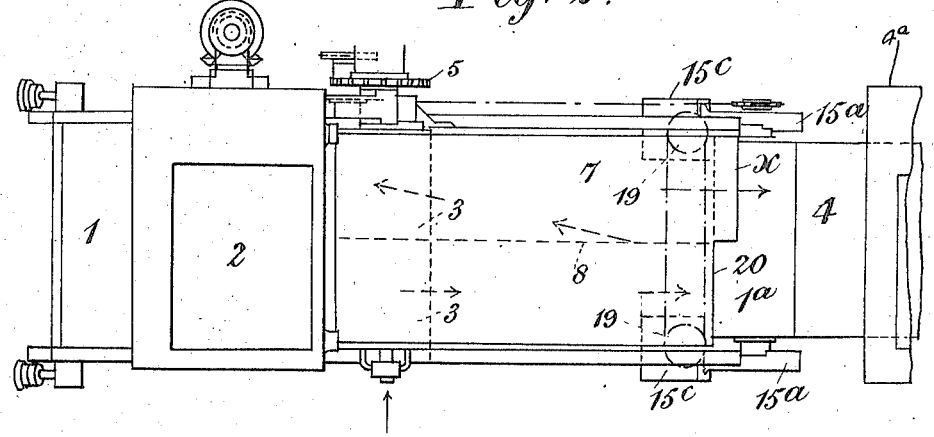
Fig: 2.

UNITED STATES PATENT OFFICE.

ASBJORN SONSTHAGEN, OF LEYTONSTONE, ENGLAND.

MACHINE FOR COATING CHOCOLATE BONBONS.

1,393,460. Specification of Letters Patent. Patented Oct. 11, 1921.

Application filed March 25, 1920. Serial No. 368,603.

*To all whom it may concern:*

Be it known that I, ASBJORN SONSTHAGEN, a subject of the King of Norway, residing in Forest Lea, Highstone, Leytonstone, Essex, England, have invented certain new and useful Improvements in Machines for Coating Chocolate Bonbons, of which the following is a specification.

This invention relates to improvements in and relating to machines for coating chocolate bonbons. When coating the cores of chocolate bonbons with machines of the "Enrober" type it is found that the weight of the coated core, as it is carried by the conveyer to the discharge end of the machine, acting upon the liquid chocolate on the under side of the core spreads same and thereby causes the coating to be much thinner at this point than upon the body.

A machine of the "Enrober" type is shown in the United States Patent Number 680,489.

Attempts have already been made to increase the thickness of the coating upon the bottom of the core, but such attempts have only met with limited success. According to one arrangement the cores pass over a carrier through which a coating of chocolate is applied to the bottom of the core. The cores are then automatically placed upon a band of special form, which band passes over a cooling table.

The present invention has for its object certain improvements whereby the above defect may be remedied, and the coating of chocolate upon the under side of the core may be of the same thickness or even thicker, than the coating upon the top.

In accordance with this invention, two endless bands, belts or carriers are employed, which carriers may be of the usual, or any other form adapted to permit the more or less ready passage of the chocolate to the under sides. The belts, carriers or the like are arranged one behind the other, with their ends closely contiguous or even overlapping somewhat. Of the two carriers the first is arranged in a plane above the plane of the second, the distance vertically between them being such that when the coated cores reach the end of the first carrier as they fall on to the second they will turn and the under side be uppermost.

As the cores are carried along by the first carrier they are passed through a stream of liquid chocolate, and then exposed to a current of air, produced for instance by means of blowers, causing the chocolate to set sufficiently before the cores are turned over, or the chocolates may be set by passing them through an other suitable or well known cooler or cooling chamber or otherwise treating them. This cooling of the chocolate is an important part of my invention.

While the cores are carried along by the second carrier they are again subjected to the action of a second stream of chocolate, after which they are allowed to set or cool in the ordinary manner. By passing the chocolate through the second stream, that which before was the under side will receive a second coating, whereby the desired thickness at this point is secured.

The existing means of regulating the thickness of the covering on the cores by shaking or using the air blast may be used in connection with the present invention, and the bottom covering means as here described may be utilized as an independent machine for the coating of flat goods only on one side.

In order that the invention may be the better understood drawings are appended showing in diagrammatic form one application of the invention in which:—

Figure 1 is a longitudinal sectional view of an apparatus embodying the present invention.

Fig. 2 is a plan.

Referring to the accompanying drawings 1 indicates the endless band or belt upon which the cores are placed to secure their first coating and by which they are carried through a stream of chocolate flowing from a hopper 2. 3 indicates a blower whereby the coated cores are cooled. 4 indicates a second endless band or belt the plane of which is somewhat lower than the plane of the first band or belt the vertical distance between the said bands or belts being such that as the coated cores fall from one to the other they will turn over, their under surfaces being then upturned.

The belt or band 4 may be that of any suitable coating machine, for example a machine of the so-called Enrober type.

As it is desirable that the cooling air for setting the first coating of the cores shall not act upon the Enrober machine, which is connected directly to the machine for effecting the aforesaid first coating, the cooling means for said coating is preferably constructed as shown in the drawings. In this case the fan indicated by 3, driven in any suitable manner through gearing 5, 6 is placed at one end of a casing 7 divided longitudinally by a partition 8 and having a passage 7ª communicating at one end with the fan casing and passing to the under side of casing 7 where it is open below to permit the air to act upon the cores on band 1. The fan is similarly divided. The air is drawn in at one end of the fan and passes in the direction of the arrows to band 1 passing across the band and then upward through the nozzle 8ª to the fan and through a passage from whence it escapes at the top of the casing 7 at the point $x$ well above the plane of the band 4.

Preferably provision is made whereby the band 1 may be adjusted to raise one end of it above the second band 4. To this end the band 1 is formed in two parts 1 and 1ª. The part 1 passes around the rollers 9, 10, 11 and 12 the latter being the driving roller for said band. Preferably the roller 9 is so supported as to enable it to be adjusted to maintain the tension of band 1. The part 1ª passes over rollers 13, 14, 15 and 16 the latter roller being the driving roller for part 1ª for which a tensioning arrangement is also provided similar to that provided for band 1. In order that the delivery end of band 1ª may be raised to the desired height above the band 4 the ends of roller 15 are carried by arms 15ª projecting upward from vertical carriages or slides 15ᵇ each mounted in guide ways formed in brackets 15ᶜ secured to the main frame of the machine. In order to effect the vertical adjustment of the carriage screwed spindles 16 are provided passing through an arm 17 on carriage 15ᵇ and each engaging a nut on the respective carriages. A handle 18 is provided upon one of the spindles 16 and in order to secure the simultaneous operation of the two spindles chain wheels 19 are provided on each spindle connected by a chain 20.

The cores in their reversed position are carried through a stream of chocolate supplied by a second hopper 4ª. The second coating may then be allowed to set or special provision may be made for effecting the rapid setting or cooling thereof.

Claims:

1. In combination, receiving and intermediate moving surfaces arranged to provide receiving faces; a discharge surface at the discharge end of the intermediate moving surface and arranged to provide a carrying face off-set below said receiving faces; and means disposed above said receiving and discharge faces for coating bodies carried on said moving surfaces.

2. An apparatus comprising receiving and intermediate moving surfaces arranged to provide horizontal upper receiving faces disposed end to end and substantially or approximately in the same plane; a discharge surface at the discharge end of the intermediate surface and arranged to provide a substantially horizontal carrying face offset below the plane of said receiving faces; means disposed above the receiving end of said receiving surface for discharging streams of coating material downwardly upon bodies carried on the surface; and means for arranging cooling air upon the receiving face of the intermediate surface.

3. An apparatus comprising receiving and intermediate moving surfaces arranged to provide horizontal upper receiving faces disposed end to end and substantially or approximately in the same plane; a discharge surface at the discharge end of the intermediate surface and arranged to provide a substantially horizontal carrying face offset below the plane of said receiving faces; means disposed above the receiving ends of said receiving and discharging surfaces for discharging streams of coating material downwardly upon bodies carried on the surfaces; a two-chambered fan having a primary and secondary chamber; means for guiding air from the primary chamber across the receiving face of the intermediate surface and into the secondary chamber; and means for guiding the air from the secondary chamber away from contact with the apparatus.

4. In combination, receiving and intermediate moving members arranged to provide receiving faces disposed end to end; a discharge member at the discharge end of the intermediate member and arranged to provide a carrying face offset below said receiving faces; and means disposed above said receiving and discharge members for coating bodies carried on the members.

5. In combination, receiving and intermediate endless belts arranged to provide receiving faces disposed end to end; a discharge belt at the discharge end of the intermediate belt and arranged to provide carrying faces offset below said receiving faces; and means disposed above said receiving and discharge belts for coating bodies carried on the belts.

6. In combination, receiving and intermediate belts arranged to provide horizontal upper receiving faces disposed end to end and substantially or approximately in the same plane; a discharge belt at the discharge end of the intermediate belt; means for supporting said belts for moving said faces in a direction away from the receiving belt toward the discharge belt; the supporting means at the discharge end of the intermediate belt being vertically adjustable; and means disposed above said receiving belts for coating bodies carried on the belts.

7. An apparatus comprising receiving and intermediate endless belts arranged to provide horizontal upper receiving faces disposed end to end and substantially or approximately in the same plane; a discharge belt at the discharge end of the intermediate belt and arranged to provide a substantially horizontal carrying face offset below the plane of said receiving faces; means disposed above the receiving end of said receiving belt for discharging streams of coating material downwardly upon bodies carried on the belt; and means for arranging cooling air upon the receiving face of the intermediate belt.

8. An apparatus comprising receiving and intermediate endless belts arranged to provide horizontal upper receiving faces disposed end to end and substantially or approximately in the same plane; a discharge belt at the discharge end of the intermediate belt and arranged to provide a substantially horizontal carrying face offset below the plane of said receiving faces; means disposed above the receiving ends of said receiving and discharging belts for discharging streams of coating material downwardly upon bodies carried on the belts; a two-chambered fan having a primary and secondary chamber; means for guiding air from the primary chamber across the receiving face of the intermediate belt and into the secondary chamber; and means for guiding the air from the secondary chamber away from contact with the apparatus.

In witness whereof I have hereunto set my hand in the presence of two witnesses.

ASBJORN SONSTHAGEN.

Witnesses:
J. N. EVANS JACKSON,
PERCY W. COY.